United States Patent [19]

Kittle et al.

[11] 3,995,711

[45] Dec. 7, 1976

[54] VEHICLE POWER STEERING ELECTRO-HYDRAULIC SAFETY BACKUP SYSTEM

[75] Inventors: Carl Edwin Kittle; Gordon K. Wiegardt, both of Cedar Falls, Iowa

[73] Assignee: Deere & Company, Moline, Ill.

[22] Filed: Mar. 18, 1976

[21] Appl. No.: 668,224

[52] U.S. Cl. .................................. 180/133; 60/405

[51] Int. Cl.² .......................................... B62D 5/06

[58] Field of Search ........... 180/133; 60/405; 417/3

[56] References Cited

UNITED STATES PATENTS

| | | | |
|---|---|---|---|
| 2,836,960 | 6/1958 | Wittren | 60/386 |
| 3,558,239 | 1/1971 | Schiber | 180/133 X |
| 3,820,620 | 6/1974 | Miller | 180/133 |
| 3,923,423 | 12/1975 | Lauck | 417/3 |

*Primary Examiner*—Joseph F. Peters
*Assistant Examiner*—R. Schrecengost

[57] ABSTRACT

Disclosed is a vehicle power steering system including an electro-hydraulic safety backup system for supplying pressurized fluid to the steering motor of the vehicle when the pressure between the main pump and the power steering system drops below a predetermined pressure level. The safety backup system includes an electrical circuit which is added on to the ignition and starting circuits of a vehicle such that the backup system will not operate in response to intermittent short duration pressure drops. The electrical circuit includes an arming feature to prevent the backup system from operating during initial start-up of the vehicle and further provides for operation of the vehicle's starting motor to have priority over the backup system operation.

8 Claims, 2 Drawing Figures

VEHICLE POWER STEERING ELECTRO-HYDRAULIC SAFETY BACKUP SYSTEM

BACKGROUND OF THE INVENTION

The present invention relates generally to a vehicle power system and more particularly to a vehicle power steering system having an electro-hydraulic backup system added thereto.

Prior art hydraulic power steering systems are known which comprise main and auxiliary pumps for supplying the pressurized fluid for driving the power steering system, the auxiliary pump being driven by an electric motor which is energized only when the fluid delivered by the main pump is inadequate for operating the power steering system. Typical of these systems is the vehicle power steering electro-hydraulic safety backup system disclosed in the U.S. Pat. No. 3,820,620 granted to Miller et al.

All these systems, are relatively complex and do not provide for ideal vehicle operation.

SUMMARY OF THE INVENTION

According to the present invention, there is provided a vehicle power steering system having an auxiliary pump driven by an electric motor, and more particularly there is provided an improved electrical circuit for controlling the operation of the electric motor.

The present invention provides a circuitry for rendering the backup system inoperative during start-ups, intermittent pressure decreases, and current overloads while causing operation during failures of the main system.

The above and additional advantages of the present invention will become apparent to those skilled in the art from a consideration of the following detailed description of the Preferred Embodiment when taken in conjunction with the accompanying drawing.

DESCRIPTION OF THE PREFERRED EMBODIMENT

Figure 1:
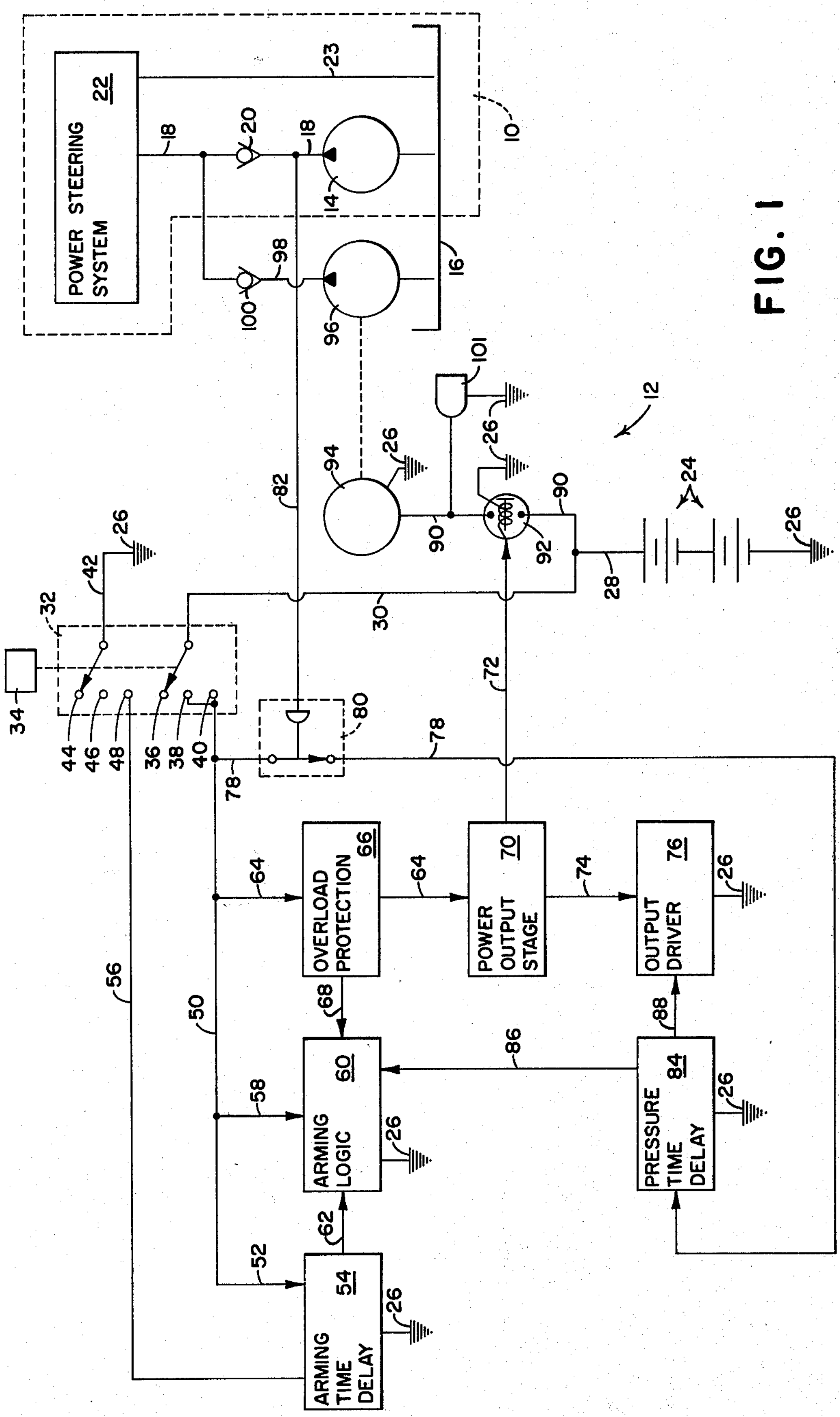
FIG. 1 is a combined electric and hydraulic circuit diagram of an electro-hydraulic vehicle power steering system including a backup system in accordance with the present invention.

Referring now to FIG. 1, therein is shown a conventional vehicle power steering and power supply system generally designated by the numeral 10 and an electro-hydraulic safety backup system generally designated by the numeral 12. A more detailed description of the conventional components of the system 10, may be had by reference to the U.S. Pat. No. 2,836,960 granted to R. A. Wittren, but to provide background for the description of the present invention, the system 10 may be considered to include a main pump 14 drawing from a fluid reservoir 16. The pump 14 supplies pressurized fluid to a main line 18 and through a check valve 20 interposed therein to a conventional power steering system 22. The return of fluid is accomplished through a return line 23 to the reservoir 16.

The electro-hydraulic safety backup system 12 is connected to batteries 24 having a negative terminal connected to an electrical ground 26 and a positive terminal connected to a main power lead 28. The main power lead 28 is connected by a source lead 30 to an ignition switch 32 which is activated by a conventional key switch 34 which is used to start the vehicle.

Upon turning of the key switch 34, the ignition switch 32 selectively connects the source lead 30 to an "off" contact 36, "ignition" contact 38, or a "start" contact 40; the ignition switch 32 also simultaneously selectively connects a ground lead 42 connected to the ground 26 to an "off" contact 44, an "ignition" contact 46, or a "start" contact 48.

The "ignition" contact 38 and the "start" contact 40 are connected together and are connected to a main input lead 50. The main input lead 50 is connected by an arming delay lead 52 to an arming time delay circuit 54. The arming time delay 54 is further connected to the ground 26 and to an arm lead 56 which is connected to the start contact 48 in the ignition switch 32.

The main input lead 50 is further connected by a logic lead 58 to an arming logic circuit 60 which will be described later in greater detail. The arming logic circuit 60 is connected to the ground 26 and with the arming time delay circuit 54 through a delay lead 62.

The main input lead 50 has additionally connected thereto a power input lead 64. Interposed in the power input lead 64 is an overload protection circuit 66 which is connected by a shutdown lead 68 to the arming logic circuit 60. The power input lead 64 is connected to a power output stage 70. The power output stage 70 is connected to an output lead 72 and to a driver lead 74. The driver lead 74 in turn is connected with an output driver 76 which is connected to the ground 26.

The main input lead 50 is still further connected to a pressure lead 78 in which is disposed a conventional, normally-closed, pressure switch 80. The pressure switch 80 is connected by a pressure fluid line 82 to the main line 18 between the main pump 14 and the check valve 20. The pressure switch 80 is selected to open in response to a predetermined fluid pressure, approximately 50 bar in the preferred embodiment, in the fluid pressure line 82. The pressure lead 78 is connected to a pressure time delay circuit 84 which is connected to the ground 26. The pressure time delay circuit 84 is further connected by an activation lead 86 to the arming logic circuit 60 and by a delay lead 88 to the output driver circuit 76.

Referring again to the main power lead 28, connected thereto is an emergency power lead 90 having interposed therein a conventional, normally-open, solenoid switch 92. The output lead 72 is connected to the solenoid switch 92 which is closable in response to current in the output lead 72 to allow current flow through the emergency power lead 90. The emergency power lead 90 is connected to a conventional backup, electrical motor 94 which is mechanically coupled to a conventional backup fluid pump 96. The fluid pump 96 is connected to the reservoir 16 and is connected through a backup line 98 and a check valve 100 to the main line 18.

Further connected to the emergency power lead 90 is a horn 101 which provides an audible warning when the solenoid switch 92 is closed.

Figure 2:
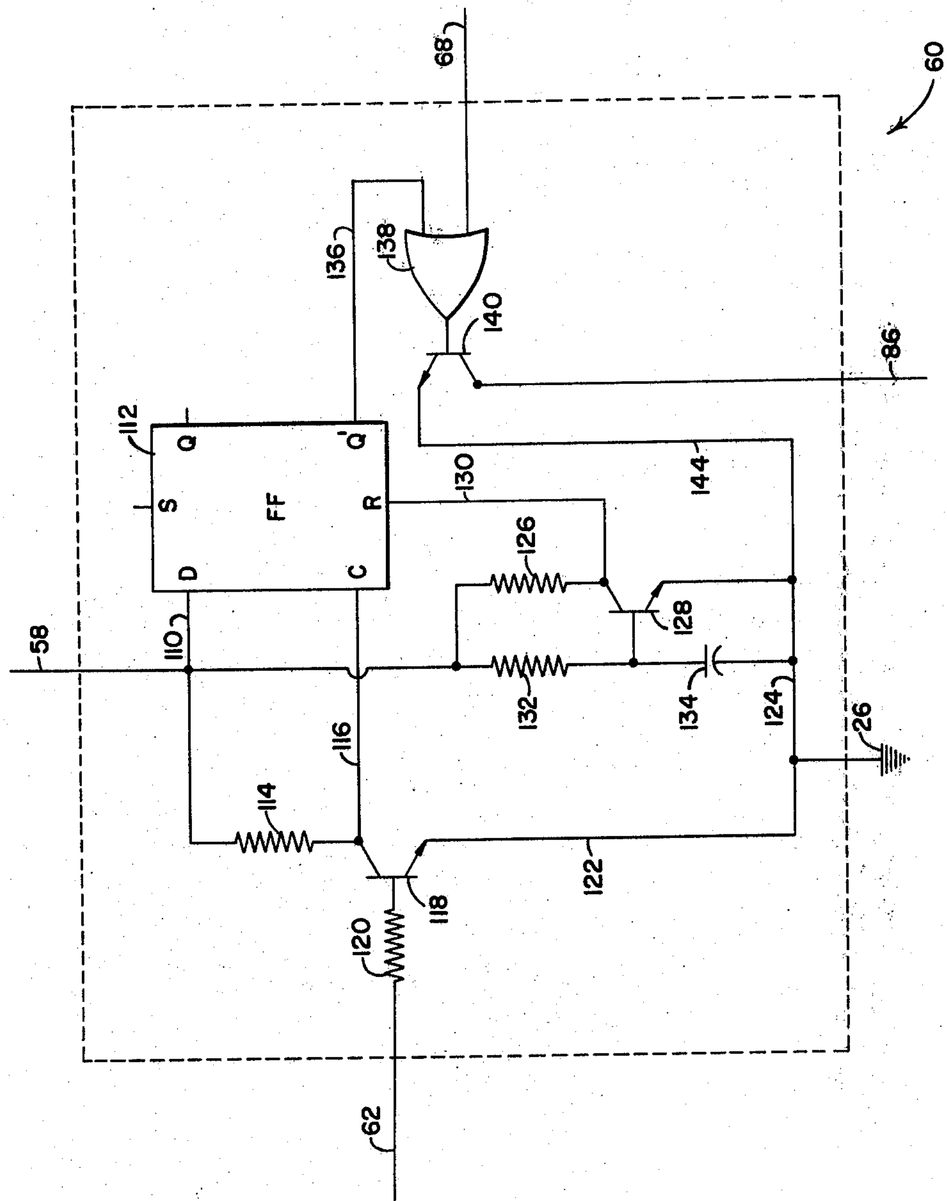
FIG. 2 is an electrical circuit schematic of an operating circuit shown in block form in FIG. 1.

Referring now to FIG. 2, therein is shown the arming logic circuit 60 represented in FIG. 1 by the block 60 which is unlike the other blocks which represent conventional electrical circuits. In the arming logic circuit 60, the logic lead 58 is connected by a data input lead 110 to the data input of a conventional D-Type flip-flop 112 and by a resistor 114 and a clock input lead 116 to the clock input of the flip-flop 112. The collector of a NPN inverter transistor 118 is connected between the resistor 114 and the flip-flop 112. The base of the transistor 118 is connected with the delay lead 62 through a resistor 120 and the emitter of the transistor 118 is connected through a lead 122 to a ground lead 124 which is connected to the ground 26.

The logic lead 58 is further connected by a resistor 126 to the collector of a NPN reset transistor 128 and thence by a reset lead 130 to the reset input of the flip-flop 112. The base of the transistor 128 is connected with the logic lead 58 through a resistor 132 and with the ground lead 124 through a capacitor 134. The emitter of the transistor 128 is connected to the ground lead 124.

The output Q' of the flip-flop 112 is connected by a Q' output lead 136 to the first input of a conventional OR gate 138. The second input of the OR gate 138 is connected to the shutdown lead 66. The output of the OR gate 138 is connected to the base of a NPN activation transistor 140. The collector of the transistor 140 is connected to the activation lead 86. The emitter of the transistor 140 is connected through a lead 144 to the ground lead 124.

The operation, the operator turns the key switch 34 in the normal manner for operating the vehicle. This causes the ignition switch 32 to switch from the off contacts 36 and 44, which are unconnected, to the ignition contacts 38 and 46.

In the "ignition" position, the batteries 24 are connected to the main input lead 50 to provide input voltage to the arming logic circuit 60 and to the pressure time delay circuit 84. The voltage on the logic lead 58 provides data, clock, and reset inputs to the flip-flop 112. The reset input of the flip-flop 112 is set to a low voltage when the capacitor 134 is charged to turn on the reset transistor 128. The innputs cause the flip-flop 112 output to switch high which causes an output from the OR gate 138 to activate the activation transistor 140 to allow current flow from the activation lead 86 to flow to the ground 26. With the activation lead 86 connected to the ground 26, current through the pressure time delay circuit 84 bypasses the delay lead 88 and the output driver circuit 76. With the output driver circuit 76 bypassed and off, the power output stage 70 is off and there is no output current on the output lead 72 and thus the solenoid switch 92 remains open to prevent starting of the motor 94. Therefore, the electro-hydraulic safety backup system 12 does not supply any fluid to the power steering system 22.

As the key switch 34 is switched from the ignition position to the start position, the main input lead 50 continues to be connected to the batteries 24 and the arm lead 56 comes into contact with the ground lead 42. n the start position, the main engine is turned over and the main pump 14 begins to pump fluid into the main line 18. With the arm lead 56 connected to the ground 26, the arming time delay circuit 54 comes into operation to provide an arm signal output through the delay lead 62 to the arming logic circuit 60 which will continue as long as the arm lead 56 is connected to ground 26 and for a predetermined duration, approximately one-third of a second in a preferred embodiment, after the arm lead 56 is disconnected from the ground 26.

In the arming logic circuit 60, the input through the logic lead 58 continues to provide an input to the clock input of the flip-flop 112 to cause the Q' output to be high until and as long as the output through the delay lead 62 turns on the inverter transistor 118. When the inverter transistor 118 is turned on, the clock input lead 116 will go low and the input at the clock input of the flip-flop 112 will return to a low voltage. The flip-flop 112 will not change state and there will continue to be a high output from Q' which continues to activate the OR gate 138 and the activation transistor 140 so as to allow current flow from the activation lead 86 to the ground 26.

By virtue of the arming lead 56 connection to the ground 26 and the time delay, the arming time delay circuit 54 prevents operation of the power output stage 70 and thus prevents simultaneous operation of the electrical motor 94 with the main vehicle starting motor. As long as the arming logic circuit 60 has a high input on either the delay lead 62 or the logic lead 58, the activation lead 86 will be connected to the ground 26 and operation of the electrical motor 94 will be prevented as previously explained.

When the operator turns the key switch 34 back to the ignition position from the start position, the arm lead 56 will be disconnected from the ground 26 and, after the predetermined time delay, the arming time delay circuit 54 will terminate the output on the delay lead 62. When the output on the delay lead 62 ceases, the inverter transistor 118 is turned off causing an input to the clock input of the flip-flop 112 which causes the Q' output to return to a low voltage. When there is not high input voltage to the OR gate from the Q' output of the flip-flop 112 or through the shutdown lead 66, as will later be explained, the OR gate is placed in its armed state and the activation transistor 140 is turned off to prevent current flow therethrough from the activation lead 86 to the ground 26.

If the main pump 12 has failed to start pumping up to the predetermined pressure during the positioning of the key switch 34 in the start position, the pressure switch 80 will remain closed causing current flow therethrough to the pressure time delay circuit 84. Since the activation lead 86 will be blocked from the ground 26, the current will then flow through the delay lead 88 to the output driver 76. Activation of the output driver 76 will allow current flow from the power output stage 70 therethrough to the ground 26 which activates the power output stage 70 to allow current flow from the main input lead 50 to the output lead 72. With current flow in the output lead 72, the solenoid switch 92 will be closed allowing current from the main power lead 28 to start the backup electrical motor 94 to cause the backup fluid pump 96 to pump into the main line 18 and power the power steering system 22. Simultaneously, the horn 101 will be activated to provide an audible warning.

The motor 94 is intended for intermittent operation only since the large current draw of the auxiliary unit would soon discharge the batteries 24 if the vehicle engine is not running. The motor 94 will continue to operate until either the pressure in the main line 18 reaches the predetermined pressure, or the power to the power output stage 70 is stopped by turning the ignition switch 32 to the off position.

If the main pump 12 has been pumping since the key switch 34 was placed in the start position, the arming time delay circuit 54 will provide a sufficient time delay for the pressure in the main line 18 to have exceeded the predetermined pressure causing the pressure switch 80 to open and prevent current flow through the pressure time delay circuit 84 to the output driver 76 and thus prevent operation of the electrical motor 94.

The vehicle will operate with the pressure switch 80 open until such time as a decrease in the pressure causes the switch 80 to close. Upon closing of the pressure switch 80, current will flow to the pressure time delay circuit 84. To prevent operation of the backup system 12 during routine sudden, short-interval decreases in pressure, as when one of the other hydraulic functions is making a sudden demand on the main pump 14, the pressure time delay circuit 84 will delay current flow in the delay lead 88 for a predetermined period, approximately four-tenths of a second in the preferred embodiment, after the pressure switch 80 closes. If the pressure switch 80 remains closed for longer than four-tenths of a second, current will flow into the output driver 76 activating it and causing the electrical motor 94 to operate as previously described.

To provide protection for the output stage from excessive currents, the overload protection circuit 66 is provided to produce an output through the shutdown lead 68 when a predetermined level of current flow to the power output stage 70 is exceeded. The output through the shutdown lead 68 will turn on the OR gate 138 and the activation transistor 140 to connect the activation lead 86 to the ground 26 and thus prevent activation of the output driver 76 and thus the power output stage 70.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. In a vehicle having a main power steering system and a hydraulic system including a source of pressurized fluid fluidly connected by a main line to the main power steering system, said vehicle further having an electrical system including a source of electrical energy having first and second potentials, an electrohydraulic emergency power steering system comprising: an auxiliary source of pressurized fluid fluidly connected to the main power steering system; an electrically responsive drive means connected to and energizable for driving said auxiliary source of pressurized fluid; an ignition switch connected to the source and having off, ignition, and arm contacts operable to connect the first potential to the off contact in an off position, to connect the first potential to the ignition contact in an ignition position, and to connect the first potential to the ignition contact and the second potential to the arm contact in a start position; normally closed pressure switch means connected to the ignition contact and fluidly connected to the main line responsive to a predetermined fluid pressure in the main line to open said pressure switch means; pressure means connected to the pressure switch means responsive to the connection of the first potential to the ignition contact and a closed pressure switch means to provide an output signal; arming means connected to the ignition and arm contacts responsive to the connection of the first potential to the ignition contact and the second potential to the arm contact to provide an arm signal; logic means connected to the ignition contact, the arming means, the pressure means, and the second potential responsive sequentially to the connection of the first potential to the ignition contact to connect the output signal to the second potential, to the connection of the first potential to the ignition contact and the second potential to the arm contact to connect the output signal to the second potential, to the arm signal to connect the output signal to the second potential, and to the absence of the arm signal to block the output signal from the second potential; and output means connected to the electrically responsive drive means, the pressure means, and the ignition contact responsive to the blocking of the output signal from the second potential to connect the first potential through the ignition contact to the electrically responsive drive means.

2. The emergency power steering system as claimed in claim 1 wherein the pressure means includes time delay means connected to the pressure switch means responsive to the connection of the first potential to the ignition contact and a closed pressure switch means to provide an output signal after a predetermined time delay.

3. The emergency power steering system as claimed in claim 1 wherein the arming means includes time delay means connected to the ignition and arm contacts responsive to the connection of the first potential to the ignition contact and the second potential to the arm contact to provide an arm signal terminating a predetermined time delay after the first potential is disconnected from the arm contact.

4. The emergency power steering system as claimed in claim 1 including overload means interposed between the ignition contact and the output means responsive to predetermined levels of electrical energy from the ignition contact to provide an overload signal; and means in the logic means responsive to the overload signal to connect the output signal to the second potential.

5. For a vehicle having a main power steering system and a hydraulic system including a main pump fluidly connected by a main line to the main power steering system, said vehicle further having an electrical system including a source of electrical energy having first and second potentials, an emergency electro-hydraulic power steering system comprising: an auxiliary pump fluidly connected to the main power steering system; an electrically responsive drive means connected to and energizable for driving said auxiliary pump; an ignition switch connected to the source and having off, ignition, and arm contacts operable to connect the first potential to the off contact in an off position, to connect the first potential to the ignition contact in an ignition position and to connect the first potential to the ignition contact and the second potential to the arm contact in a start position; normally closed pressure switch means connected to the ignition contact and fluidly connected to the main line responsive to a predetermined fluid pressure in the main line to open said pressure switch means; pressure time delay means connected to the pressure switch means responsive to the connection of the first potential to the ignition contact and a closed pressure switch means to provide an output signal after a predetermined time delay; arming time delay means connected to the ignition and arm contacts responsive to the connection of the first potential to the ignition contact and the second potential to the arm contact to provide an arm signal terminating a predetermined time delay after the first potential is disconnected from the arm contact; logic means connected to the ignition contact, the arming time delay means, the pressure time delay means, and the second potential responsive sequentially to the connection of the first potential to the ignition contact to connect the output signal to the second potential, to the connection of the first potential to the ignition contact and the second potential to the arm contact to connect the output signal to the second potential, to the arm signal to connect the output signal to the second potential, and to the absence of the arm signal to block the output signal from the second potential; and output means connected to the electrically responsive drive means, the pressure time delay means, and the ignition contact responsive to the blocking of the output signal from the second potential to connect the first potential through the ignition contact to the electrically responsive drive means.

6. The emergency power steering system as claimed in claim 5 including overload means interposed between the ignition contact and the output means responsive to a predetermined level of electrical energy from the ignition contact to provide an overload signal; and means in the logic means responsive to the overload signal to connect the output signal to the second potential.

7. For a vehicle having a main power steering system and a hydraulic system including a main pump fluidly connected by a main line to the main power steering system, said vehicle further having an electrical system including a source of electrical energy, and an electrical ground, an electro-hydraulic backup system comprising: an auxiliary pump fluidly connected to the main power steering system; an electric motor connected to and energizable for driving said auxiliary pump; an ignition switch connected to the source and the ground and having off, ignition, and arm contacts operable to connect the source to the off contact in an off position, to connect the source to the ignition contact in an ignition position, and to connect the source to the ignition contact and the ground to the arm contact in a start position; normally closed pressure switch means connected to the ignition contact and fluidly connected to the main line responsive to a predetermined fluid pressure in the main line to open said pressure switch means; pressure time delay means connected to the pressure switch means responsive to the connection of the source to the ignition contact and a closed pressure switch means to provide an output signal after a predetermined time delay; arming time delay means connected to the ignition and arm contacts responsive to the connection of the source to the ignition contact and the ground to the arm contact to provide an arm signal terminating a predetermined time delay after the ground is disconnected from the arm contact; logic means connected to the ignition contact, the arming time delay means, the pressure time delay means, and the ground responsive sequentially to the connection of the source to the ignition contact to connect the output signal to the ground, to the connection of the source to the ignition contact and the ground to the arm contact to connect the output signal to the ground, to the arm signal to connect the output signal to the ground and to the absence of the arm signal to block the output signal from the ground; output driver means connected to the pressure time delay means and the ignition contact responsive to the blocking of the output signal from the ground to connect the ignition contact to the ground; and power output stage means connected to the electric motor, the ignition contact, and to the output driver means responsive to the connection of the ignition contact to the ground therethrough to connect the ignition contact to the electric motor.

8. The electro-hydraulic backup system as claimed in claim 7 including overload means interposed between the ignition contact and the power output stage means responsive to a predetermined level of electrical energy from the ignition contact to provide an overload signal and means in the logic means responsive to the overload signal to connect the output signal to the ground.

* * * * *